United States Patent [19]
de Koning

[11] 3,777,992
[45] Dec. 11, 1973

[54] SPREADER
[75] Inventor: Cornelis J. de Koning, Nieuw-Vennep, Netherlands
[73] Assignee: H. Vissers N.V., Nieuw-Vennep, Netherlands
[22] Filed: Dec. 3, 1971
[21] Appl. No.: 204,445

[30] Foreign Application Priority Data
Dec. 8, 1970 Netherlands .................. 7017863

[52] U.S. Cl. .............................................. 239/689
[51] Int. Cl. ......................... A01c 3/06, E01c 19/20
[58] Field of Search ..................... 239/668, 669, 689

[56] References Cited
UNITED STATES PATENTS
3,298,696  1/1967  Vissers ............................... 239/689
1,157,532  10/1915  Harper ............................... 239/689
3,372,877  3/1968  Vissers ............................... 239/689

Primary Examiner—Lloyd L. King
Attorney—John P. Snyder et al.

[57] ABSTRACT

A spreader, e.g. fertilizer, comprises an oscillating spreading mechanism, owing to which the spreader as well as the towing vehicle are subject to considerable oscillating movements, causing much wear to said spreader and vehicle and worrying the human driver. The spreader according to the invention is more quiet and/or can spread fertilizer over a considerably larger width, in that compensation mass for damping movements is supported by the frame of the spreader.

5 Claims, 10 Drawing Figures

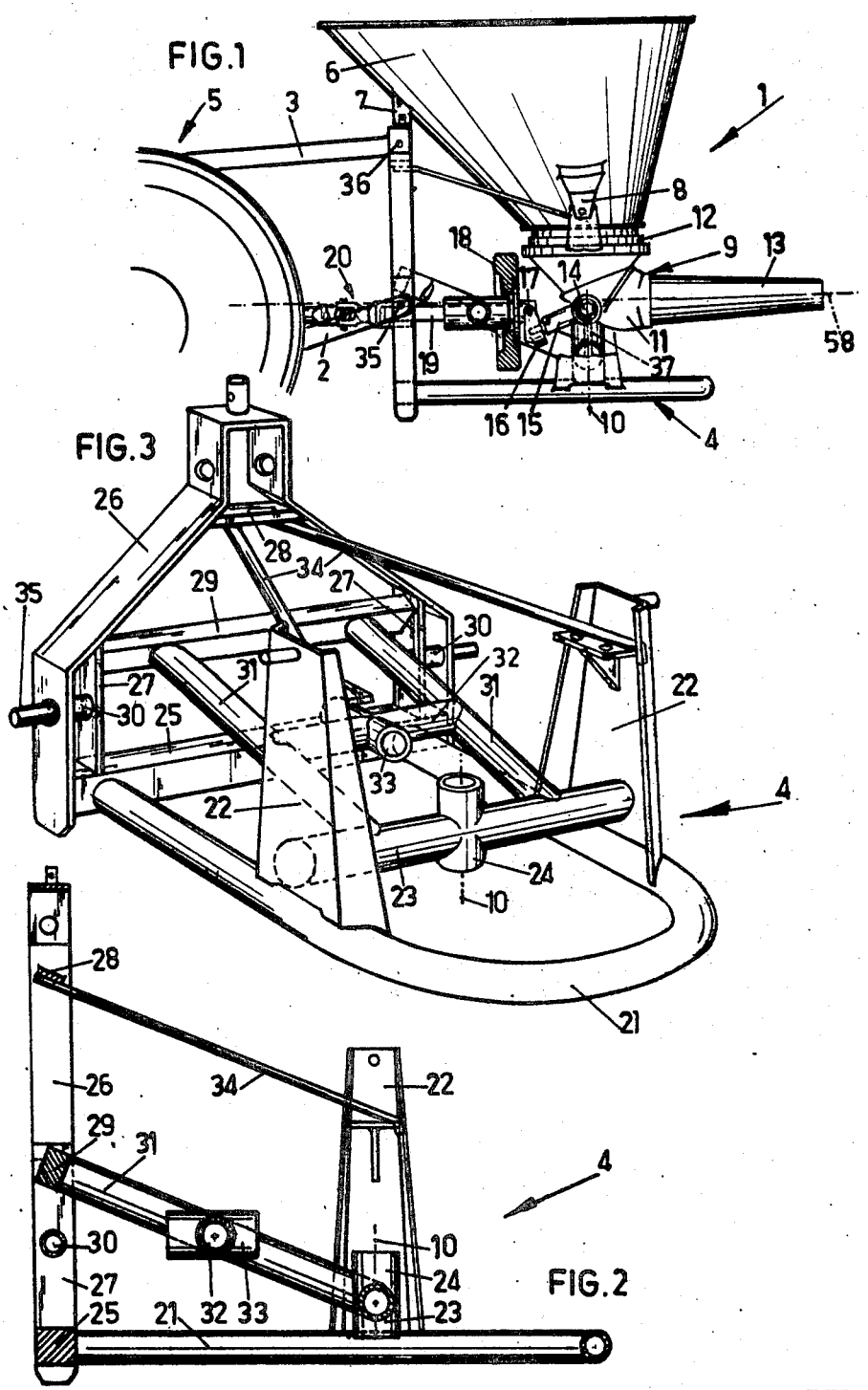

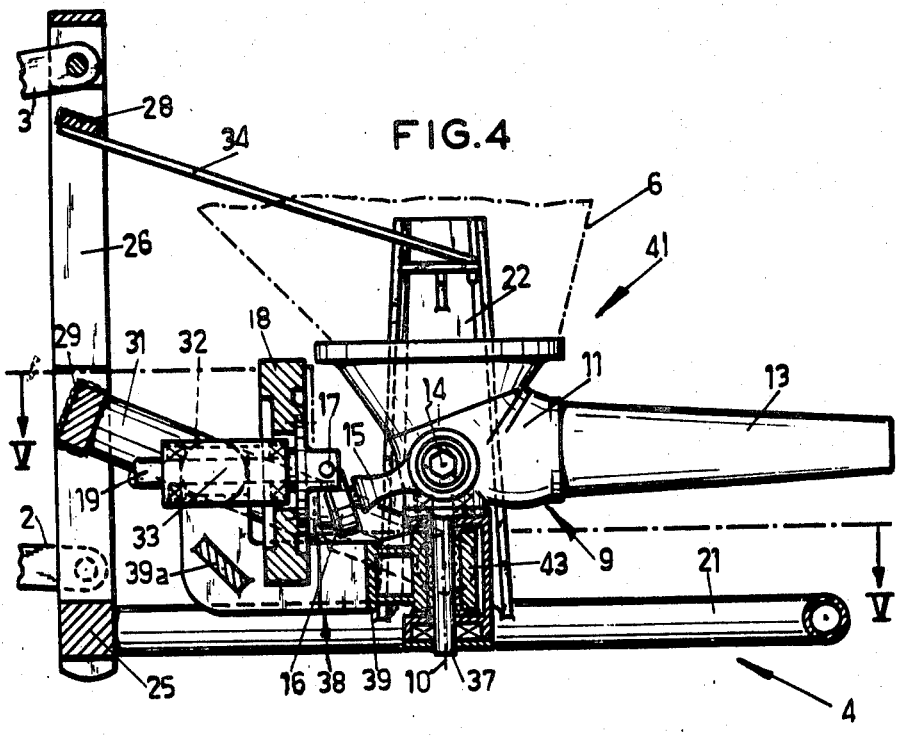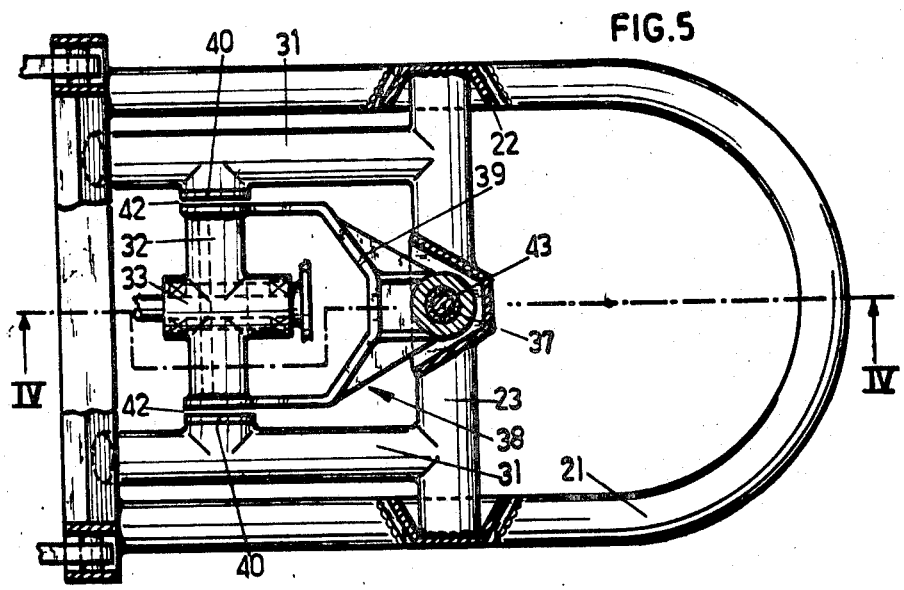

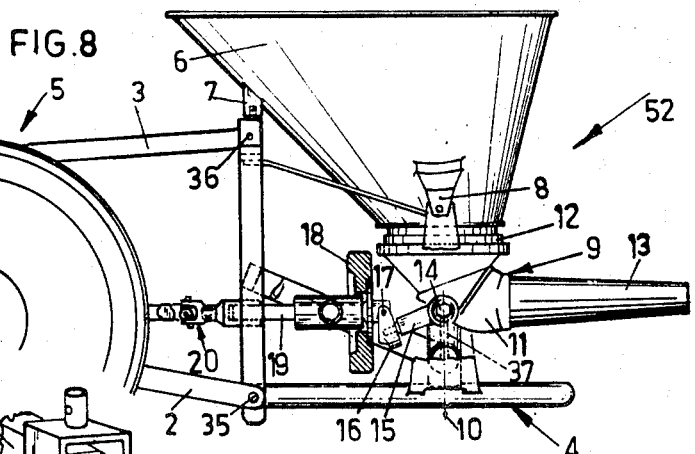

SPREADER

The invention relates to a spreader for spreading material, e.g. fertilizer, at least comprising a frame to be attached to a vehicle, e.g. agricultural tractor, a storage hopper supported by said frame, a dosage mechanism, a spreading mechanism oscillatingly moving relatively to said frame and communicating via the dosage mechanism with the storage hopper and drive means driving the spreading mechanism.

Such a spreader is known.

The known spreader as well as the known vehicle moving it forwards are subject to considerable oscillating accelerations, retardations and/or movements causing much wear to said spreader and the vehicle and very worrying the driver of the vehicle.

The inertia forces concerned increase with the velocity of the oscillating movement of the spreading mechanism. The admissible velocity of the oscillating movement of the spreading mechanism and therewith the spreading width are restricted in order to restrict the varying accelerations, retardations and/or movements unto the value admissible for the driver, the vehicle and the spreader.

The object of the invention is to provide a spreader which in comparison with the known spreader is considerably more quiet and/or which can spread material over a considerably larger spreading width, in that compensation mass for damping movements of the frame is supported by the frame, said movements being caused by the oscillating movement of the spreading mechanism.

In a spreader according to the invention being simply performed, the frame consists mainly of tubular of hollow elements and of at least one solid, steel bar mounted on a considerable distance from the centre of oscillation of the spreading mechanism and forming compensation mass.

However, the compensation mass can also be movable with respect to the frame and can then preferably be damped by means of a damper.

In a further developed spreader according to the invention compensation mass is oscillatingly driven by the drive means in contrary sense, but with the same frequency as the spreading mechanism.

The compensation mass of another particularly quiet spreader according to the invention is formed by an auxiliary frame, which is swingable with respect to the frame round a standing shaft mounted in the vicinity of the centre of oscillation of the spreading mechanism and carrying drive means for driving the spreading mechanism.

The invention will be elucidated in the following description with reference to the embodiments shown in the accompanying drawing.

In the drawing:

FIGS. 1, 4, 6 and 8 each show a side view partly broken away of each time another spreader according to the invention suspended to an agricultural tractor;

FIGS. 2 and 3 show a longitudinal section and a perspective view respectively of the frame of the spreader of FIG. 1;

FIG. 5 shows a section along the line V—V of FIG. 4;

FIG. 9 shows a perspective view of the frame of the spreader of FIG. 8, and

FIG. 10 shows a section over a detail of the spreader of FIG. 8.

Figure 6:
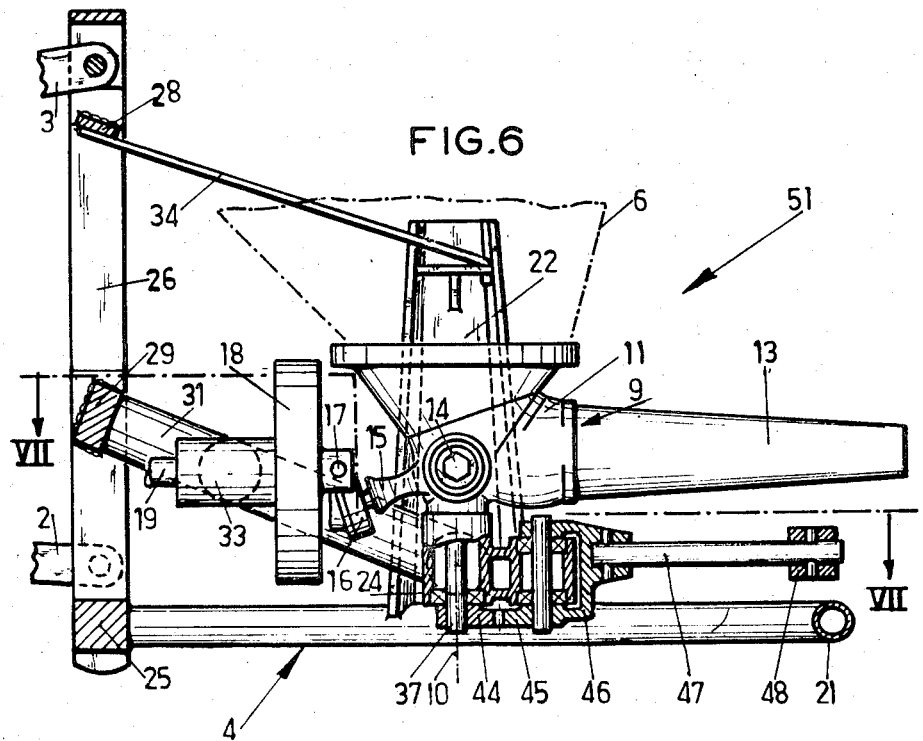

The spreader 1 of FIG. 1 comprises a frame 4 suspended with ball joints 35 and 36 to an agricultural tractor 5 by means of suspension rods 2 and top rod 3 (see FIGS. 2 and 3) and a storage hopper 6 for receiving the material to be spreaded, e.g. fertilizer. The storage hopper 6 is rigidly attached to the frame 4 by means of connecting members 7 and 8. Below the storage hopper 6 a spreading mechanism 9 is beared with a journal 37 swingably round a vertical axis 10 in the frame 4. The spreading mechanism 9 comprises a bowl 11 communicating via a dosage mechanism 12 with the storage hopper 6, a spreading nozzle 13 communicating with the bowl 11 and a fork 15 engaging hingeably round horizontal pins 14 to the bowl 11, the free end of said fork 15 being swingably beared in a crank 16 of drive means. These drive means comprise further a driving shaft 19, on which shaft 19 the crank 16 is beared swingably round a joint pin 17, and a fly wheel 18 coupled with said driving shaft 19. The driving shaft 19 is driven by means of a propeller shaft 20 from the power take off of the agricultural tractor 5. In order to manufacture the frame 4 efficiently, it consists of the following parts welded to each other:

a U-shaped base tube 21, supporting at both sides a U-profiled leg 22 for supporting the storage hopper 6, a tubular transverse beam 23 having a bearing 24 for the bowl 11, a solid steel transverse bar 25, a bow 26 bent of a metal strip and being stiffened with posts 27, plate 28, middle rod 29 and cases 30, longitudinal tubes 31 connecting the middle rod 29 with the transverse beam 23, a transverse tube 32 mounted between the longitudinal tubes 31 and carrying the bearing 33 of the driving shaft 19, and stays 34 formed by thin rods. All steel parts mentioned are performed so strongly, as is efficiently justified for their function with the exception of the transverse rod 25 and the middle rod 29 which are manufactured of massive steel instead of of tube material and which form compensation mass for taking up the oscillating inertia forces caused by the oscillating swinging movement of the spreading mechanism round axis 10. The transverse rod 25 and the middle rod 29 are provided on a considerable distance from the centre of oscillation of the spreader 1 lying near the axis 10. The size of the additional compensation mass of the rods 25 and 29 is preferably chosen according to the fist-rule, that the moment of inertia of the mass is sufficient in the situation shown when the proportion of the weight of the complete mass of the frame 4 with the empty storage hopper 6 in kgf. to the maximum swing velocity in m/sec. of the free end of the spreading nozzle 13 is as 5 to 6.

The ball joints 35 of the suspension rods 2 are mounted substantially at the level of the spreading mechanism 9. The moment of the inertia forces raised by the spreading mechanism 9 and the moment of reaction taken up by the agricultural tractor 5 find themselves now in about the same horizontal plane 58, so that the remaining oscillating couple is now nil. This measure can also be applied in each of the spreaders 41, 51 and 52 of FIGS. 4-10.

The spreader 41 of FIGS. 4 and 5 is identical to the spreader 1 with the understanding that the bearing 33 is welded to a transverse tube 32 provided with clearance 42 between longitudinal tubes 51 and making part together with a bow 39 of an auxiliary frame 38. The bow 39 is beared with a bearing bush 43 swingably with respect to the frame 4 round the swinging journal 37 of the bowl 11. During the oscillating swinging movement of the spreading mechanism round the axis 10 the drive means will meet each time with reaction forces opposite to the forces of inertia, and swing as a result thereof together with the auxiliary frame 38 in contrary sense. In this way the auxiliary frame 38 together with the drive means beared in said auxiliary frame 38 constitutes a compensation mass. Preferably an extra weight 39a is mounted in said auxiliary frame 38. The vibration system will show a resonance frequency. By means of the quantity of ballast this frequency can be brought upon e.g. ± 1 Hz. The clearance 42 can be bounded by an elastic buffer, e.g. consisting of a strip of rubber 40.

Figure 7:
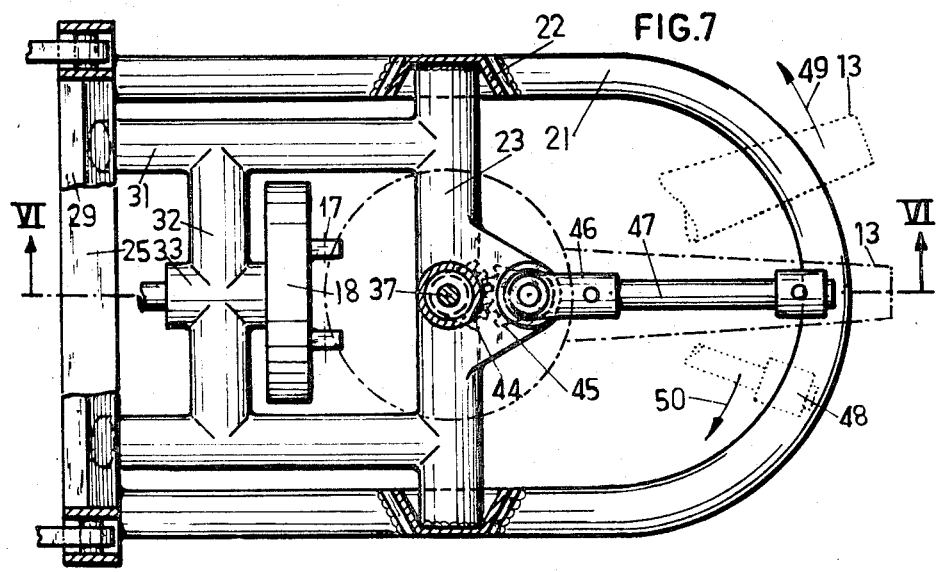
FIG. 7 shows a section along the line VII—VII of FIG. 6.

The spreader 51 of FIGS. 6 and 7 is identical to the spreader 1 with the understanding that the journal 37 of the bowl 11 is rigidly coupled with a tooth segment 44 which cooperates with tooth segment 45 swingably beared in the frame 4 round a shaft 46 and rigidly connected with an arm 47 carrying at its free end a weight 48. As FIG. 7 shows with dotted lines the spreading nozzle 13 and the weight 48 move according to arrows 49 and 50 in opposite direction round the centre of oscillation lying near the axis 10. The weight 48 and the length of arm 47 are chosen so large, that the moment of inertia of the mass of the spreading mechanism and of the compensation mass of arm 47 and weight 48 are substantially equal, so that the inertia resistances of the spreading mechanism and those of the compensation mass nearly neutralize each other.

The spreader 52 of FIGS. 8, 9 and 10 is identical to the spreader 1 with the understanding that the spreader 52 is provided with a dynamic vibration damper 53. The casing of the dynamic vibration damper 53 is preferably formed by the transverse rod 25a which is performed in this spreader 52 as a closed tube. The dynamic vibration damper 53 has a compensation mass 55 movably suspended by means of a spring 56 in the damper 53, while said damper 53 is further filled with liquid 57. The compensation mass 55 remaining on the casing 25a owing to inertia makes liquid 57 displace in the casing 25a through a narrow slit 54 and adverses so while destroying mechanic energy, the oscillating vibrations of the frame 4.

With the above described spreaders 1, 41, 51 and 52 fertilizer can be regularly spreaded over an effective width of 9 to 11 m. The swing velocity of the end of the spreading nozzle 13 is then 14 to 17 m/sec.

What is claimed is:

1. A spreader adapted to be attached to and spread material from behind a powered vehicle, said spreader comprising in combination:
   a frame including bearing means fixed thereto for defining a substantially vertical oscillation axis;
   spreader means mounted on said frame and engaged with said bearing means for oscillation about said oscillation axis;
   power transfer means mounted on said frame and connected to said spreader means for oscillating said spreader means by drive from the powered vehicle whereby oscillatory vibrations are imparted to said frame incidental to spreader operation;
   means mounted on said frame for feeding material to said spreader means; and
   compensation mass means on said frame and displaced from said oscillation axis for counteracting said oscillatory vibrations whereby the spreader means may be operated at a higher speed and with greater oscillatory excursions than otherwise would be possible.

2. A spreader as defined in claim 1 wherein said compensation mass means is rigidly attached to and forms part of said frame.

3. A spreader as defined in claim 1 wherein said compensation mass means is flexibly attached to said frame and forms part of said power transfer means.

4. A spreader as defined in claim 1 wherein said frame includes a hollow member and said compensation mass means comprises a weight resiliently located in said hollow member.

5. A spreader as defined in claim 1 wherein said bearing means is provided with a gear sector and said compensating mass means includes an arm pivotally mounted on said frame and having a second gear sector meshing with the gear sector on said bearing means.

* * * * *